(12) United States Patent
Charbonneau et al.

(10) Patent No.: US 9,878,503 B2
(45) Date of Patent: Jan. 30, 2018

(54) METHOD FOR PREPARING COMPOSITE STRUCTURES AND CONSUMABLE ASSEMBLY THEREFOR

(75) Inventors: Alain Charbonneau, Blainville (CA); Jérôme Ferland, Sainte-Pétronille (CA); Royal Therien, St-Stanislas de Kostka (CA); Jacques André, Saint-Jerome (CA); Jose Alberto Urbiola, Queretaro (MX)

(73) Assignee: BOMBARDIER INC., Dorval, Québec (CA)

( * ) Notice: Subject to any disclaimer, the term of this patent is extended or adjusted under 35 U.S.C. 154(b) by 243 days.

(21) Appl. No.: 14/422,839

(22) PCT Filed: Aug. 23, 2012
(Under 37 CFR 1.47)

(86) PCT No.: PCT/IB2012/054270
§ 371 (c)(1),
(2), (4) Date: Jun. 5, 2015

(87) PCT Pub. No.: WO2014/030036
PCT Pub. Date: Feb. 27, 2014

(65) Prior Publication Data
US 2016/0059499 A1    Mar. 3, 2016

(51) Int. Cl.
*B29C 70/44*    (2006.01)
*B29C 33/50*    (2006.01)
(Continued)

(52) U.S. Cl.
CPC .......... *B29C 70/443* (2013.01); *B29C 33/505* (2013.01); *B29C 70/446* (2013.01);
(Continued)

(58) Field of Classification Search
CPC ..... B29C 70/44; B29C 70/443; B29C 70/446; B29C 30/505; B29L 2031/3982
See application file for complete search history.

(56) References Cited

U.S. PATENT DOCUMENTS

| 4,923,541 A | 5/1990 | Burger |
| 5,171,510 A | 12/1992 | Barquet et al. |
(Continued)

FOREIGN PATENT DOCUMENTS

| EP | 2402134 A2 | 1/2012 |
| FR | 2473080 | 10/1981 |

OTHER PUBLICATIONS

International Search Report dated May 9, 2013, for International Patent Application No. PCT/IB32012/054270.
(Continued)

*Primary Examiner* — Robert B Davis
(74) *Attorney, Agent, or Firm* — Karceski IP Law, PLLC (57) ABSTRACT

Methods, a consumable assembly, and a tool for preparing a composite structure from a laminate disposed on a surface of a mold. The method involves preparing consumable materials, such as a breather sheet and a vacuum bag, and preparing an inflatable tool, outside of the mold. These prepared consumable materials and the inflatable tool are then inserted into the mold, and the inflatable tool is inserted into a folded assembly of the breather and vacuum bag. Once inserted into the mold, the inflatable tool is inflated, which deploys the consumable materials against the laminate. A vacuum can be generated, which maintains the deployed consumable materials against the laminate. This can be done for many hours. Finally, the laminate is cured inside the mold so as to form the composite structure.

17 Claims, 7 Drawing Sheets

(51) Int. Cl.
  B29L 31/30     (2006.01)
  B29K 63/00     (2006.01)
  B29K 105/08    (2006.01)
  B29K 307/04    (2006.01)
(52) U.S. Cl.
  CPC .. *B29K 2063/00* (2013.01); *B29K 2105/0872* (2013.01); *B29K 2307/04* (2013.01); *B29L 2031/3082* (2013.01)

(56) References Cited

U.S. PATENT DOCUMENTS

| | | | | |
|---|---|---|---|---|
| 5,266,249 | A * | 11/1993 | Grimes, III | B29C 70/44 114/357 |
| 7,754,322 | B2 * | 7/2010 | Tilbrook | C08G 59/38 428/297.4 |
| 7,811,495 | B2 | 10/2010 | Dagher et al. | |
| 8,114,241 | B2 * | 2/2012 | Iagulli | B29C 70/32 156/285 |
| 8,430,984 | B2 * | 4/2013 | Lee | B29C 33/405 156/169 |
| 2010/0155984 | A1 | 6/2010 | Hollensteiner et al. | |
| 2011/0259515 | A1 | 10/2011 | Rotter et al. | |
| 2012/0056358 | A1 | 3/2012 | Dixon | |

OTHER PUBLICATIONS

Written Opinion of the International Searching Authority dated May 9, 2013, for International Patent Application No. PCT/IB2012/054270.

* cited by examiner

METHOD FOR PREPARING COMPOSITE STRUCTURES AND CONSUMABLE ASSEMBLY THEREFOR

CROSS-REFERENCE TO RELATED APPLICATION(S)

This is a National Stage Entry into the United States Patent and Trademark Office from International PCT Patent Application No. PCT/IB2012/054270, having an international filing date of 23 Aug. 2012, the entire contents of which are incorporated herein by reference.

FIELD OF THE INVENTION

The present invention relates to composite structures. More particularly, the present invention relates to a method for preparing composite structures, and a consumable assembly, and an inflatable tool therefor.

BACKGROUND OF THE INVENTION

It is known when manufacturing structures from composite materials to apply heat, pressure, and vacuum. One technique for applying vacuum is known as vacuum bagging.

During vacuum bagging, a vacuum is applied over a period of time to a laminate consisting of a substrate and a resin. The created vacuum sucks excess resin, trapped air, volatiles, etc. out of the laminate, helping to create a laminate free of cavities and impurities which will eventually be cured so as to form the structure. In addition, the vacuum might also improve maintaining the laminate in an appropriate position for curing.

Figure 1:
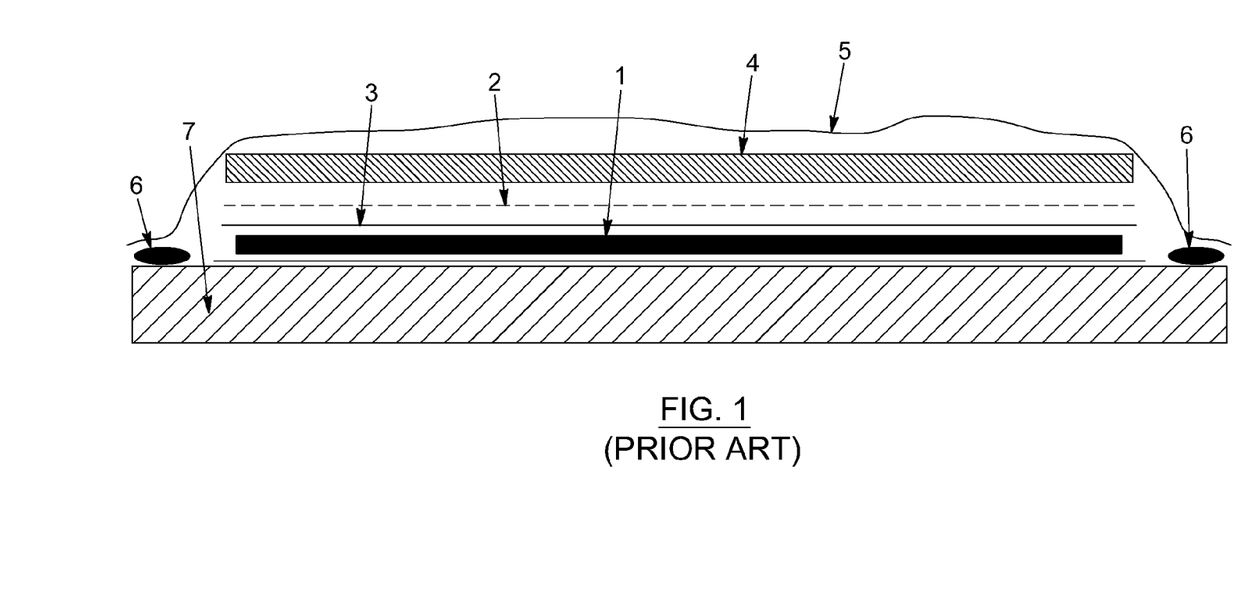
FIG. 1 is a view of a vacuum bagging layup known in the art.

As shown in FIG. 1, a typical vacuum bagging operation begins by laying the laminate (1) inside a mold (7) having the form of the structure to be manufactured. Once the laminate (1) is secured in place, a layer of "consumable materials" is laid against the laminate. Consumable materials might be, for example, sheets of fabric or plastics that facilitate the vacuum bagging process. One such consumable material might be a release film (2), consisting of a layer of thin plastic, which is applied directly against the laminate (1) or, alternatively, on top of a peel ply (3). Another example of a consumable material might be a sheet of "breather" (4), which might be a nylon sheet that absorbs resin sucked out of the laminate (1). The breather (4) can be used to make the vacuum level uniform inside the vacuum bag (5), and the release film (2) can be used to control the amount of resin that will be sucked out of the laminate (1), thus preventing the breather (4) from being permanently bound to the laminate (1) during curing. Together, the release film (2) and breather (4) may improve the flow of resin sucked out of the laminate (1) and its collection.

Once the consumable materials are applied against the laminate (1), the mold or tool (7) to which vacuum will be applied is delimited and sealed by sealant tape (6). The vacuum bag (5), which might be a plastic sheet, such as nylon with a thickness in the range of about 0.002 to 0.003 inches, is placed over the entire assembly and sealed to the mold (1) by the sealant tape (6). Then, air is sucked out from the vacuum bag (5) for a given period of time, in some instances for hours, causing the resin and other undesirables to be sucked out from the laminate (1). The laminate (1) can then be cured (i.e. heat treated) so as to form the desired structure. The curing technique can consist of maintaining an elevated temperature for a certain period of time so as to enable cross-linking in the resin.

Such a technique is used in numerous fields. In aeronautics, vacuum bagging can be used to create composite materials in the shape of relatively small components, such as a part of a wing, for example. Vacuum bagging can also be used to form composite materials in the shape of relatively large components as well, such as sections of an aircraft fuselage.

U.S. Pat. No. 5,171,510 issued Dec. 15, 1992 to Barquet et al. relates to a method of producing a frame made of a composite material. The method involves draping pre-impregnated fabrics on a form, and placing inflatable bladders between the form and a counter form. A mold is then closed on the form, bladders and the counter form, and the bladders are then inflated to compress the fabrics against the form and counter form.

United States patent application published Oct. 27, 2011 under publication No. US 2011/0259515 A1 and in the name of Rotter et al. relates to a method for forming composite layups having complex geometries. A composite layup is placed on a bag and bladder. The bag and bladder are both inflated to compact the layup against a part surface, and are then deflated so that a tool assembly can be withdrawn.

Also known to the Applicant are the following patents and/or patent applications: U.S. Pat. No. 7,811,495 B2; and EP 2 402 134 A2.

However, a drawback associated with traditional vacuum bagging and other gas-extraction techniques is that they might not be ideal for large composite structures, such as sections of aircraft fuselages, which have large upper surfaces requiring much labour and skill to properly apply a vacuum bag. In these structures, consumable materials can tend to fall off the upper surfaces due to gravity, which renders traditional vacuum bagging techniques more time consuming and resource intensive. Another drawback associated with traditional techniques is that for large composite structures, such as those having large upper surfaces, an important volume of air needs to be vacuumed so as to properly position the vacuum bag, which causes further delays in the composite material preparation process.

It would therefore be advantageous to provide a simpler, more efficient technique of vacuum bagging large structures. It would be advantageous to use a tool to facilitate the application of a vacuum bag prior to, or during, curing of a composite layup. It would also be advantageous if this tool could be reused repeatedly, thereby procuring cost savings.

SUMMARY OF THE INVENTION

The present invention provides a method for preparing a composite structure from a laminate disposed on a surface of a mold, the method comprising:
  preparing consumable materials and an inflatable tool outside of the mold;
  inserting the prepared consumable materials and the inflatable tool into the mold, the inflatable tool being positionable inside the consumable materials; and
  inflating the inflatable tool, thereby deploying the consumable materials against the laminate.

Optionally, the preparation the consumable materials and the inflatable tool further comprises:
  assembling a plurality of breather sections, each breather section overlapping at least a part of another breather section;
  covering at least a portion of the assembled breather sections with a vacuum bag;

folding at least one of the assembled breather sections and the vacuum bag so as to form a tubular assembly; and
inserting the inflatable tool into the tubular assembly.

The present invention also provides a consumable assembly for composite material curing in a mold, the consumable assembly comprising:

an inflatable tool insertable into consumable materials so as to inflate the consumable materials, thereby deploying the consumable materials against a laminate disposed on a surface of the mold; and
a vacuum-drawing system for maintaining the deployed consumable materials against the laminate.

The present invention also provides a method for preparing a structure from a laminate disposed on a surface of a mold, the method comprising:

inserting consumable materials into the mold; and
deploying the consumable materials against the laminate.

The present invention also provides an inflatable tool for inflating consumable materials, thereby deploying the consumable materials against a laminate disposed on a surface of a mold, the inflatable tool comprising:

an inflatable membrane insertable into the consumable materials so as to deploy the consumable materials; and
an air pump for inflating the inflatable membrane.

The present invention also provides a method for preparing a fuselage-sized laminate for a curing process, the method comprising:

preparing consumable materials and an inflatable tool outside of a fuselage-sized mold;
inserting the prepared consumable materials and the inflatable tool into the fuselage-sized mold, the inflatable tool being positionable inside the consumable materials; and
inflating the inflatable tool, thereby deploying the consumable materials against the laminate.

BRIEF DESCRIPTION OF THE DRAWINGS

The invention will be better understood upon reading the following non-restrictive description of some exemplary embodiments thereof, made with reference to the accompanying drawings in which.

While the invention will be described with reference to some examples of its embodiments, such a description does not limit the scope of the invention to such example embodiments. On the contrary, the invention covers all alternatives, modifications and equivalents as may be defined by the appended claims.

DETAILED DESCRIPTION OF EXEMPLARY EMBODIMENTS OF THE INVENTION

In the following description, the same numerical references refer to similar elements. The embodiments shown in the figures are preferred, for exemplification purposes only.

In addition, although the examples of embodiments of the present invention as illustrated in the accompanying drawings comprise various components, etc., and although the exemplary embodiments of the structure and corresponding parts of the present invention as shown consist of certain geometrical configurations as explained and illustrated herein, not all of these components and geometries are essential to the invention and thus should not be taken in their restrictive sense, i.e. should not be taken as to limit the scope of the present invention. Other suitable components and cooperation therebetween, as well as other suitable geometrical configurations may be used for the method and assembly according to the present invention, as will be briefly explained herein and as can be easily inferred herefrom, without departing from the scope of the invention.

It will be appreciated that the present invention may be practiced without some of the specific details which have been set forth herein below in order to provide a thorough understanding of the invention.

The methods of the present invention are described herein as a series of steps. It will be understood that these steps may be performed in any logical order. Moreover, the methods may be performed alone, or in conjunction with other procedures and methods before, during or after such methods and steps set forth herein without departing from the scope of the present invention.

According to one aspect of the present invention, there is provided a method for preparing a composite structure. By "preparing", it is understood that actions and/or steps are completed so as to create, or facilitate the creation of, a composite structure. The expression "composite structure" as used herein refers to a physical component made from two or more materials that have different physical or chemical properties, such as the cured materials of a laminate. One example of such a laminate includes a carbon fiber substrate pre-impregnated with an epoxy resin.

The laminate is placed against a mold, such as a mold for forming the forward and aft sections of a fuselage of an aircraft, for example. Other types of molds include, but are not limited to, molds for other sections of an aircraft, or indeed molds for multiple sections of an aircraft. The molds referred to herein are not limited to aircraft sections, and include molds for various aircraft components, parts, etc. with which the methods, assembly, and tool described herein may be used. Mold sections can be rather large, and are often cylindrical in shape. They therefore have upper curved sections against which the laminate must be secured and upon which vacuum bagging may be performed for the laminate to form the desired composite structure. The method can involve the use of a vacuum source, such as a pump, compressor, or similar such device, which may be exterior to the mold.

Figure 2:
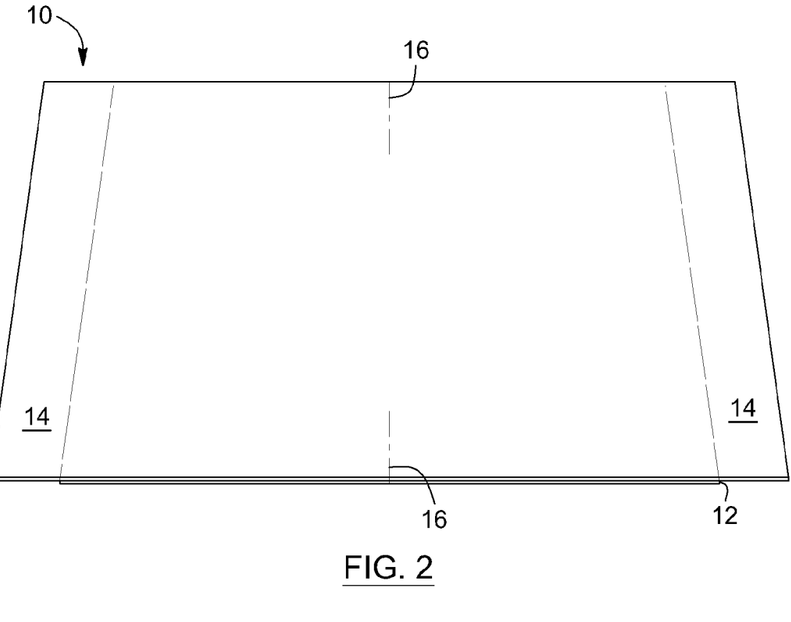
FIG. 2 is a schematic view of a vacuum bag laid upon a breather section in accordance with an embodiment of the present invention.
Figure 3:
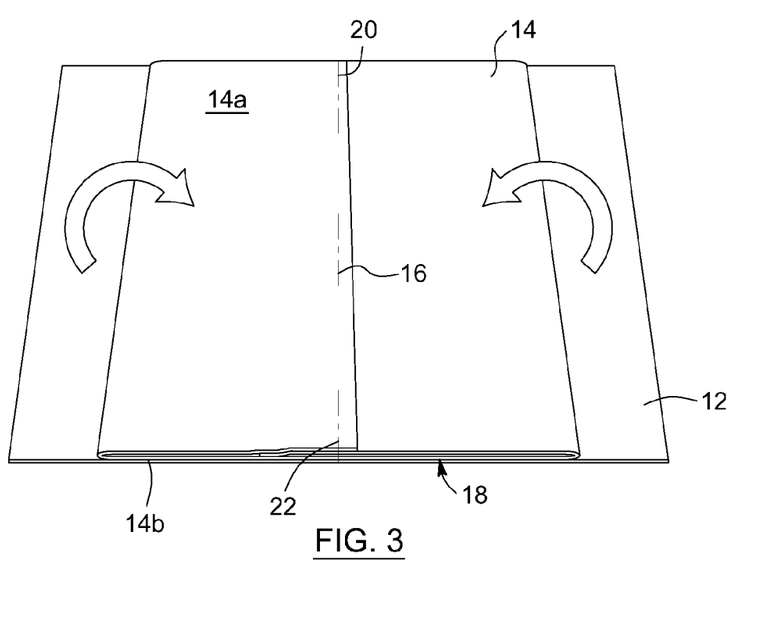
FIG. 3 is schematic view of the vacuum bag and the breather section of FIG. 2, the vacuum bag being shown folded onto itself.

Referring to FIGS. 2 and 3, the method includes the step of preparing consumable materials 10 outside of the mold. As mentioned previously, the consumable materials 10 can include sheets or plies of breather fabrics, vacuum bagging films, release film, and other materials used during vacuum bagging operations. In the illustrated example of FIGS. 2 and 3, the consumable materials 10 consist of at least one breather section 12 (or "breather") and at least one vacuum bagging sheet 14 (or "vacuum bag"). The breather 12 can be any suitable breather fabric used for vacuum bagging, and can be made of nylon or polyether, either woven or non-woven, among other materials. Multiple breather 12 and vacuum bags 14 can be used. For example, the breather 12 can consist of three distinct sections, each section overlapping an adjacent section by anywhere from about 2" to about 10", or preferably about 6".

In one possible embodiment, the step of preparing the consumable materials 10 includes cleaning a work area beforehand. Cleaning the area upon which the consumable materials 10 are assembled helps to avoid impurities or other desirable materials (i.e. dust, small particles, dirt, etc.) from entering the assembled consumable materials 10, and possibly the laminate or mold. The work area can be wiped clean, and then covered with a clean film, or pieces of clean film which can be joined together. The top surface of the clean film can then be wiped, and the wiped-clean film can be folded and stored in a clean room for future use.

In another possible embodiment of the invention, the step of preparing the consumable materials 10 includes assembling the breather sections 12, where each breather 12 can overlap an adjacent breather 12 by about 6". The overlapping breather 12 sections can be joined by any appropriate adhesive, such as a double-sided tape. The dimensions of the assembled breathers 12 can then be measured to ensure they substantially conform to the dimensions of the structure to be formed, such as the dimensions of the forward or aft sections of an aircraft fuselage. Any excess material can then be removed, or if extra material is required, it can be added.

The breathers 12 so assembled can then be covered by the vacuum bag 14, as shown in FIG. 2, where the vacuum bag 14 is shown as being transparent and placed on top of the breathers 12. Prior to covering the breathers 12 with the vacuum bag 14, the center lines 16 of the ends of the assembled breathers 12 can be marked, so as to facilitate the preparation of the consumable materials 10.

As exemplified in FIG. 3, the vacuum bag 14 may be folded onto itself, thereby creating a tubular assembly 18 or envelope into which an inflatable tool can be inserted, as described below. Alternatively, the vacuum bag 14 and/or the breathers 12 can be supplied as pre-formed tubular assemblies, and do not require specific folding or sealing techniques to create the tubular assembly 18. The folded vacuum bag 14 may consist of an upper section 14a and a lower section 14b. The lower section 14b is exemplified in FIG. 3 as being the folded portion below, and opposed to, the upper section 14a. Prior to folding the vacuum bag 14, and as with the breathers 12, a top center line 20 can be marked on the ends of the upper section 14a, and a bottom center line 22 can be marked on the ends of the lower section 14b of the vacuum bag 14, so as to facilitate the preparation of the consumable materials 10. Therefore, when the vacuum bag 14 is folded, its top and bottom center lines 20,22 can align with the breather's 12 center lines 16. Once so folded, the ends of the vacuum bag 14 that overlap can be sealed with an appropriate sealant (i.e. tape, adhesive, etc.), thus forming the tubular assembly 18. The sides of the folded vacuum bag 14 can be about 6" away from the ends of the breather 12, as this may facilitate additional sealing operations between the vacuum bag 14 and the mold.

Figure 4:
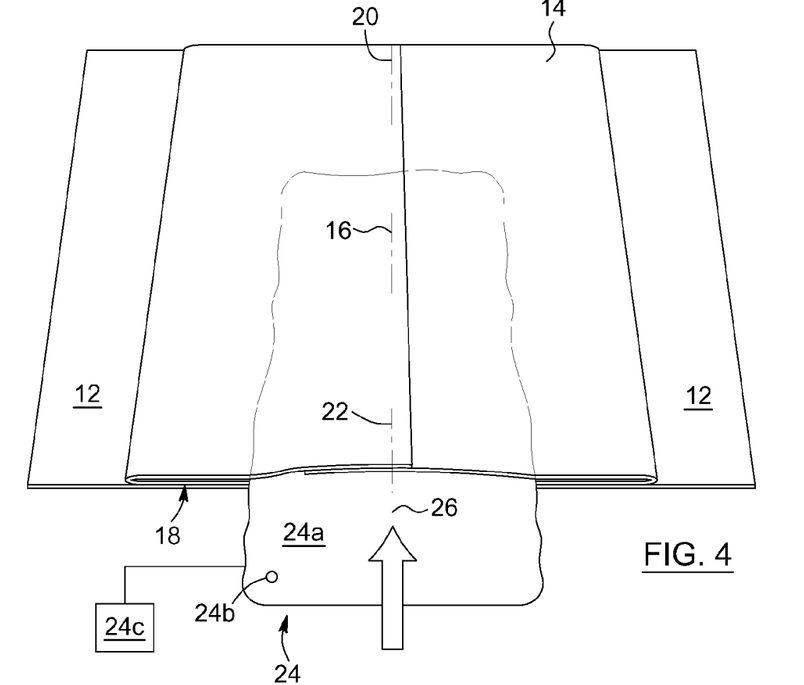
FIG. 4 is a schematic view of an inflatable tool being inserted into the folded vacuum bag of FIG. 3.

Referring now to FIG. 4, an inflatable tool 24 can then be inserted into the tubular assembly 18 at one end of the folded vacuum bag 14. The inflatable tool 24 can be any membrane or envelope 24a which can be inflated and deflated repeatedly, and which can be handled easily without the risk of it tearing. The inflatable tool 24 may therefore have a release valve 24b, for facilitating the deflation of the inflatable membrane 24a when needed. Some examples of materials used to make the inflatable tool 24 include plastics, and rubber. The inflatable tool 24 can be made into the shape of the structure to be formed. For example, when the structure consists of the aft section of an aircraft fuselage, the inflatable tool 24 can be in the shape of a long, tube-like membrane. The inflatable tool 24 can be sourced with air from outside the mold, such as via a gas or an air pump 24c. The inflatable tool 24 may also have center lines 26, which can be aligned with those of the vacuum bag 14 and the breathers 12 upon its insertion into the tubular assembly 18. In one possible configuration, the inflatable tool 24 is positioned on the vacuum bag 14 before the vacuum bag 14 is folded to form the tubular assembly 18. In such a configuration, the inflatable tool 24 can be properly placed and configured on the vacuum bag 14, and the vacuum bag 14 folded about the inflatable tool, 24, which may facilitate deployment of the consumable materials. In another possible configuration, the ends of the inflatable tool 24 coincide substantially with the ends of the breathers 12 so that the inflatable tool 24 has roughly the same shape and size as the consumable materials it will support.

Figure 5:
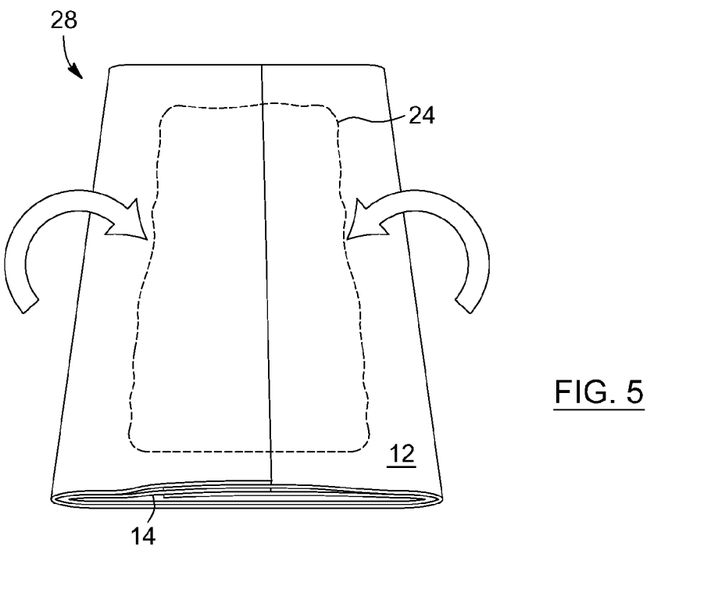
FIG. 5 is a schematic view of the inflatable tool of FIG. 4 inserted into the folded vacuum bag, where the breather section is folded over the folded vacuum bag.

Referring to FIG. 5, the ends of the breathers 12 may be folded over the tubular assembly 18, which can consist of the folded vacuum bag 14 inside which the inflatable tool 24 may be located, so as to form a consumable assembly 28. Thus, the consumable assembly 28 may consist of the inflatable tool 24, around which can be folded the vacuum bag 14, the vacuum bag itself being covered by the folded breathers 12. The ends of the breathers 12 may be joined or sealed by any suitable means, such as by an adhesive similar to double-sided tape. In one possible configuration, the ends of the breathers 12 folded over each other overlap by about 6". The consumable assembly 28 can then be folded unto itself, such as along a lengthwise direction (i.e. along its length) and as often as is required, so as to reduce the overall width of the consumable assembly 28 to about 3'. At such a width, the consumable assembly 28 is easier to handle and manipulate by technicians.

Figure 6:
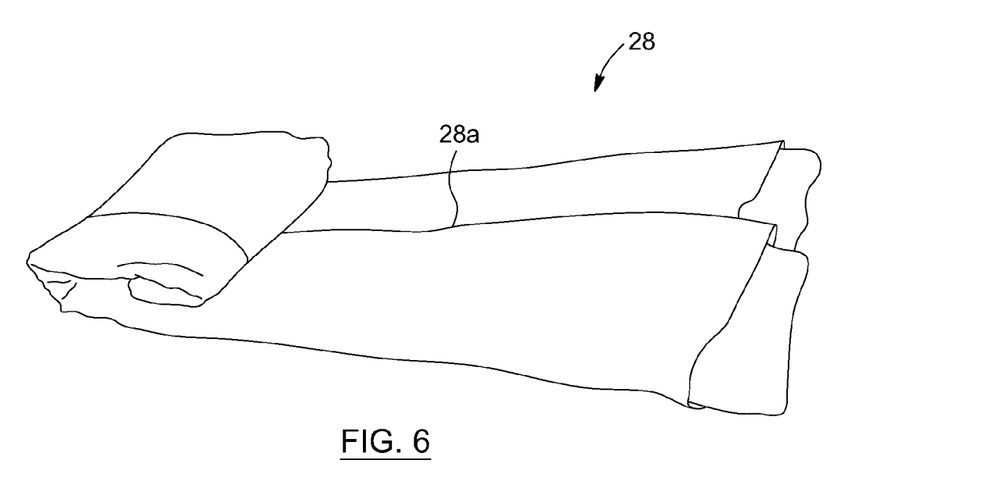
FIG. 6 is a schematic view of an assembly of vacuum bag, breather section, and inflatable tool being folded in accordance with another embodiment of the present invention.
Figure 7:
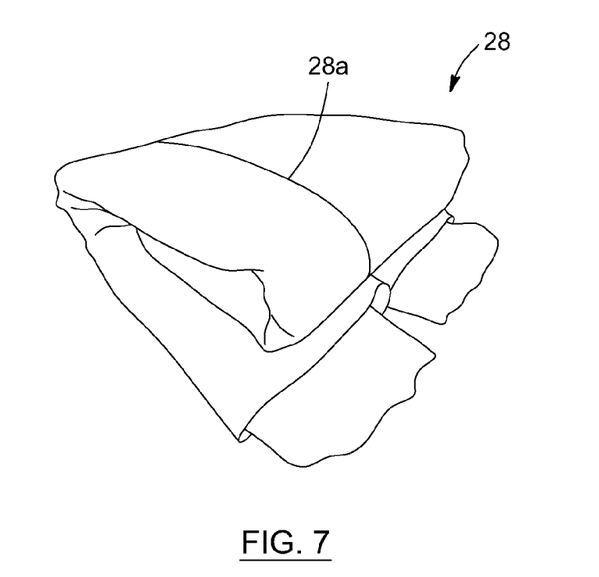
FIG. 7 is a schematic view of the assembly of FIG. 6 being shown in a folded-up configuration.

Referring to FIGS. 6 and 7, the consumable assembly 28 can be compacted, such as by folding and/or rolling, so as to occupy a smaller footprint and so as to make future operations simpler to undertake. This compaction can facilitate the transportation of the consumable assembly 28, as well as its positioning about the mold, and its insertion therein. The consumable assembly 28 can have a central line 28a. FIG. 6 provides one example of the central line 28a, which is shown running along a longitudinal direction (i.e. along the length) of the center of the consumable assembly 28. Other orientations and configurations of the central line 28a are also possible provided that the central line 28a divides the consumable assembly 28 along a fold line.

To facilitate the compaction and transport of the consumable assembly 28, the consumable assembly 28 may be folded about its central line 28*a*. One example of a technique for folding the consumable assembly 28 about its central line 28*a* involves folding the consumable assembly 28 in half along its length and/or width, thus halving the length and/or width of the consumable assembly 28. This folding operation can be repeated about a new central line 28*a* defined by the halved consumable assembly 28. Thus it is understood that one consumable assembly 28 can have many central lines 28*a*, with each central line 28*a* being created with each folding operation. Such a folding operation can be repeated until the consumable assembly 28 becomes about three feet wide, for example. Alternatively, the folding operation can be repeated until the width of the consumable assembly 28 matches or is similar to the width of the mold into which it will be inserted.

Once the consumable assembly 28 is so folded, another, subsequent folding operation can be performed to further compact the consumable assembly 28 in order to facilitate its transport and its positioning at the mold. The consumable assembly 28 can be folded lengthwise on itself. One technique for folding the consumable assembly 28 in this way involves rolling the consumable assembly 28 in a lengthwise direction, from one of its ends to another. For example, when vacuum bagging a forward section of the fuselage, the consumable assembly 28 can be rolled in a direction similar to the orientation of the forward end of the fuselage to the aft end of the fuselage. Alternatively, when vacuum bagging an aft section of the fuselage, the consumable assembly 28 can be rolled in a direction similar to the orientation of the aft end of the fuselage to the forward end of the fuselage. Of course, other such compaction and/or folding techniques are possible. The rolled consumable assembly 28 can then be stored for use in a clean bag or site.

Figure 8:
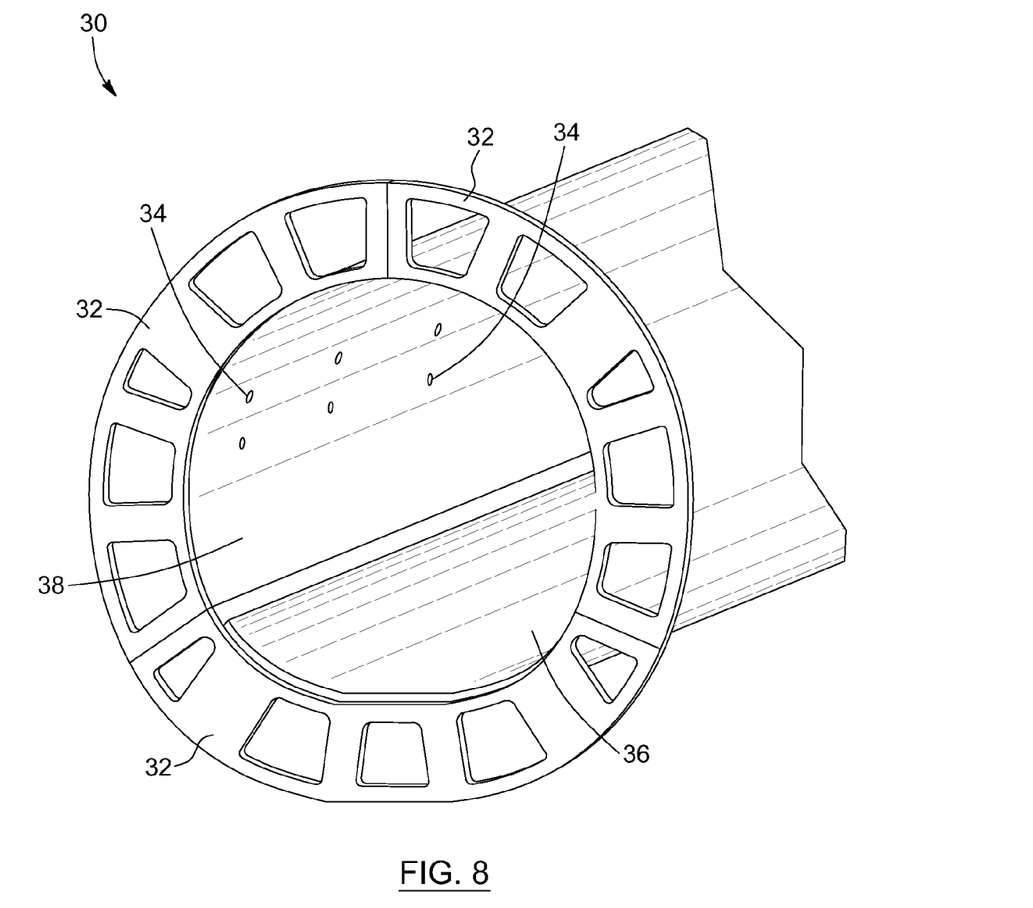
FIG. 8 is a perspective view of a mold in accordance with yet another embodiment of the present invention.

The method also includes the step of inserting the prepared consumable materials 10 and the inflatable tool 24 into a mold. The mold can be any suitable container, tool, template, frame, or other such structure used to give shape to a laminate of materials. Although the description references molds for aircraft components, it is understood that the techniques and components described herein with respect to vacuum bagging can be used with molds or tools for forming structures in other fields. One example of a mold 30 is shown in FIG. 8. This mold 30 can be used for forming sections of a fuselage of an aircraft. The mold 30 can have multiple mold sections 32, which are illustrated as being demarcated by sectional lines, so as facilitate assembly and dismantling of the mold 30. The mold 30 can also have vacuum ports 34 through which air is drawn.

In one optional embodiment, and prior to inserting the prepared consumable materials 10 into the mold 30, the laminate 36 is secured to an interior surface 38 of the mold 30, such as an upper interior surface 38, and prepared for the vacuum bagging process. Edge dams, which can be rubber-like strips, can be installed around the laminate's 36 edges. Release film can then be laid over the laminate 36, for example, so as to avoid the breather sticking to the laminate. The release film can be laid on the surface of the laminate 36 facing into the mold 30, and can be taped to the laminate 36, with attention being paid so that the release film does not cover the vacuum ports 34. Excess release film can be trimmed. The release film may be perforated, and when laid over the laminate 36, bridging may need to be avoided.

Sealant tape can then be applied directly onto the mold 30 and can contour the laminate to be vacuum bagged and cured. In some cases, it may be preferable to apply the sealant tape onto a bridging material like Teflon™ tape so as to facilitate the removal of the sealant tape from the mold after curing.

Figure 9:
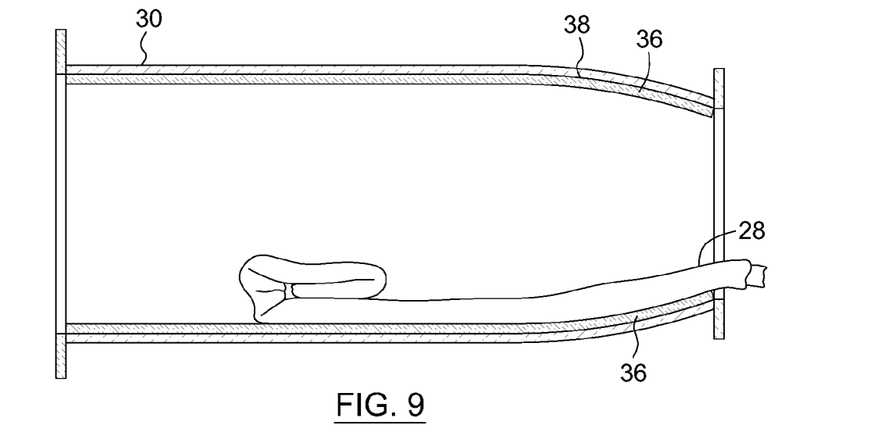
FIG. 9 is a cross-sectional view of the mold of FIG. 8, where an assembly of vacuum bag, breather section, and inflatable tool is unfolded inside the mold.
Figure 10:
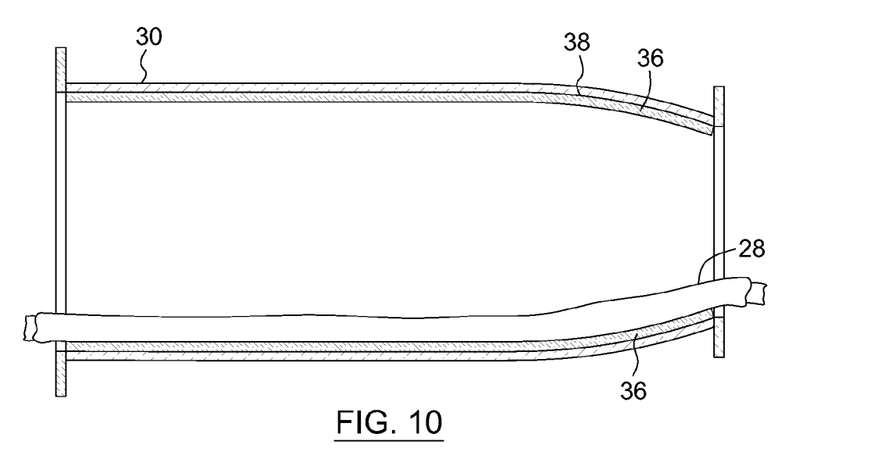
FIG. 10 is a cross-sectional view of the assembly of FIG. 9 being completely unfolded.

Referring to FIGS. 8 and 9, the consumable assembly 28 may be inserted into a bottom section of the mold 30. It may be desirable in some configurations to situate the ends of the breathers 12 nearest to the sealant tape so that the vacuum bag 14 is not sucked directly against the mold 30 when vacuum bagging occurs. When vacuum bagging a forward fuselage, for example, the consumable assembly 28 may be situated near the aft end of the mold 30. Alternatively, when vacuum bagging an aft fuselage, for example, the consumable assembly 28 may be situated near the forward end of the mold 30. As exemplified in FIGS. 8 and 9, the consumable assembly 28 may be unfolded and/or unrolled into the mold 30, along a lengthwise direction, from one end of the mold 30 to another, so that all consumable materials 10 have the same orientation as the mold 30.

Figure 11:
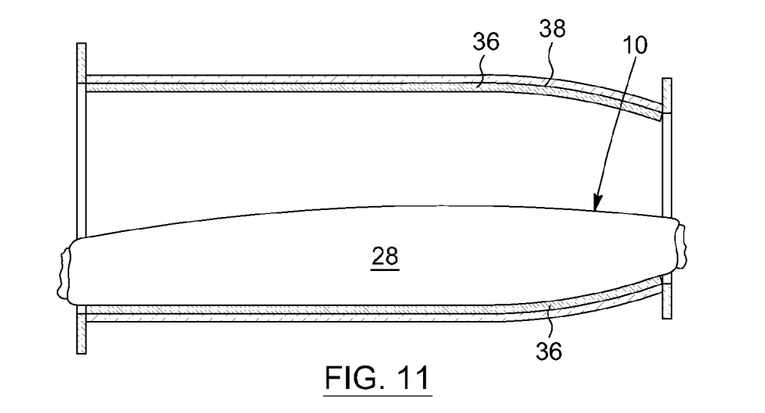
FIG. 11 is a cross-sectional view of the assembly of FIG. 9 being partially inflated.
Figure 12:
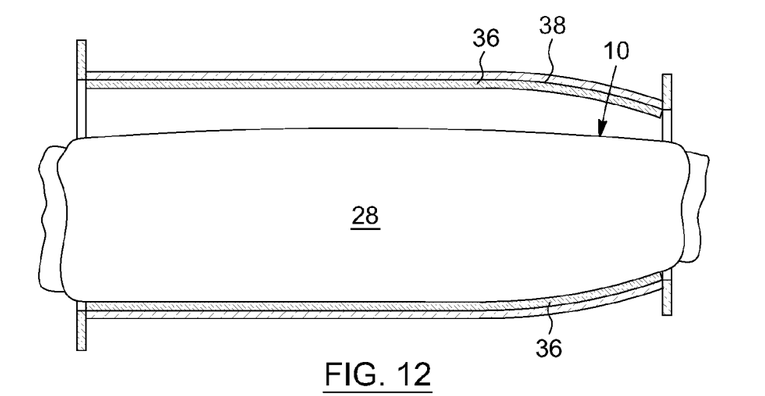
FIG. 12 is a cross-sectional view of the assembly of FIG. 9 being partially inflated.
Figure 13:
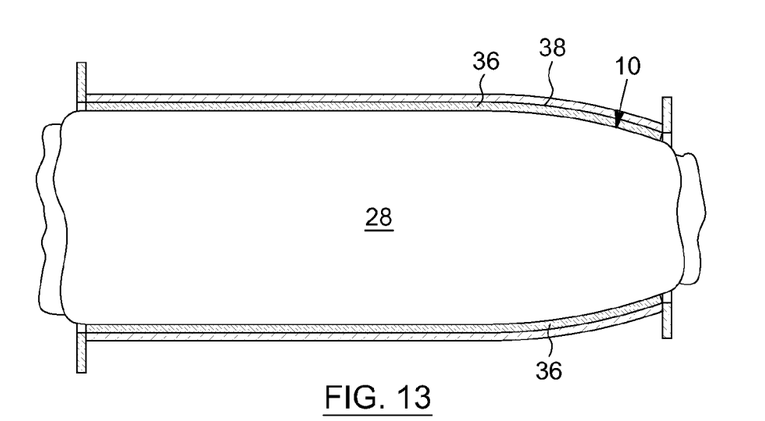
FIG. 13 is a cross-sectional view of the assembly of FIG. 9 being fully inflated.

Referring to FIGS. 11 and 12, the method also includes the step of inflating the inflatable tool 24, thereby deploying the consumable materials 10 (i.e. the breathers 12, the vacuum bag 14, etc.) of the consumable assembly 28 against the surface of the laminate 36. In so doing, the consumable materials 10 are brought closer to the laminate 36 to be vacuum bagged, and the inflatable tool 24 can evenly lay and hold the breather 12 and vacuum bag 14 against the laminate 36 to be cured. The inflatable tool 24 can be inflated by any suitable air pump, either within our outside the mold 30. The inflatable tool 24 can be inflated to occupy any desired volume within the mold 30, and can be inflated to occupy the entire volume of the mold 30 such that the consumable materials 10 press against the laminate 36, as exemplified in FIG. 13. In one example of an inflation cycle, the inflatable tool 24 is inflated from between about ten to about twenty minutes, although other times and duration are possible. Once the inflatable tool 24 is inflated to the desired volume, the vacuum bag 14 can be sealed at the contour of the mold 30 and/or laminate 36 by using the sealant tape, thereby creating a substantially sealed enclosure from which air can be drawn. The laminate 36 is thus now ready to be vacuum bagged. Thus, it is understood that, when viewing from the outside of the mold 30 and descending into the mold 30, the layers of materials can be sequentially arranged as follows: inner surface of mold, laminate, release film, breathers, vacuum bag, and inflatable tool.

The method may also include the step of activating a vacuum source and/or generating a vacuum to draw and maintain the deployed consumable materials 10 against the laminate 36. This action can be performed for a long duration, from ten to twenty hours, for example, although other times and durations are possible. In so doing, excess resin, impurities, and volatiles are drawn from the laminate. Optionally, the vacuum source can be applied in stages. In a first stage, a partial vacuum is applied, which is sometimes all that is necessary to draw and maintain the vacuum bag 14 towards/against the laminate 36. The partial vacuum so generated may not be as strong as a full vacuum, and may be applied at about 1 inHg, for example, allowing technicians to adjust creases and spread out agglomerated vacuum bag 14 in areas requiring it. The partial vacuum allows the vacuum bag 14 to be properly positioned by technicians before a full vacuum is generated, if necessary.

According to one possible embodiment, the vacuum can be increased or set until the consumable materials 10 no longer require the inflatable tool 24 to be maintained against the laminate 36. When this occurs, the inflatable tool 24 can be deflated, and withdrawn from the mold 30. When removing the inflatable tool 24, it can be rolled to avoid unnecessary chafing that may be caused by the relatively heavy inflatable tool 24 against the relatively thin material of the vacuum bag 14. A final adjustment of the vacuum bag 14 and/or all consumable materials 10 can be performed by making the necessary pleats across the surface of the mold 30, by spreading an excess vacuum bag 14, etc. Then, a final, full vacuum can be generated. The pressure of the full vacuum may vary depending on the maximum allowable pressure or on the altitude of the location, to name but a few factors. For example, in Montreal, the full vacuum may be generated at a pressure of 29 inHg. The full vacuum can be generated and held from anywhere between about ten to about twenty hours to ensure that all air and undesirables have been adequately and substantially withdrawn, thus completing vacuum bagging operations.

The method may also include the step of curing the laminate 36 inside the mold 30, thereby forming the composite structure. The curing can consist of a heat treatment over a duration of time to chemically and structurally combine the substrate and the resin of the laminate so as to form a composite structure. The techniques described herein allow for the use of an oven for curing, which may be less expensive and less cumbersome to use, when compared to an autoclave. Indeed, the method, assembly, and tool described herein does not depend on particular type of cure operation or a particular curing apparatus, and the curing can be performed in either a conventional oven known in the art, or in an autoclave, for example. Curing can also be performed simultaneously with the steps of inflating the inflatable tool 24 and/or the step of generating a vacuum described above, thereby saving time and associated costs. Once cured, the composite structure can be removed and used as desired.

It is understood that the steps of the claimed method described herein do not need to be performed individually or sequentially. Such steps may be performed simultaneously with another step and/or many other steps, and may even be performed in any particular order. One example of this may be the step of inflating the inflatable tool 24, which can be performed before, and/or simultaneously with, the generation of a partial or full vacuum. Indeed, the inflation of the inflatable tool 24 can be performed simultaneously with the generation of a partial vacuum, for example, so as to enable technicians to adjust creases and spread out agglomerated vacuum bag 14 while the consumable materials 10 are being deployed against the laminate 36. Alternatively, a partial vacuum may be generated, the inflatable tool 24 can be fully inflated, and then the full vacuum can be generated. Many such operations are possible and within the scope of the claimed method.

As being now better appreciated, the techniques and components described herein facilitate the task of vacuum bagging in large composite molds, such as molds for sections of an aircraft fuselage, and those having large upper sections which undergo vacuum bagging. In some possible situations, the inflation of an inflatable tool and the deployment of the consumable materials can reduce the time required to vacuum the air from the vacuum bag layup from over an hour, to less than ten minutes. This can be possible because the deployment of the consumable materials, and their preparation outside of the mold prior to being deployed, may allow for a roughly 80% reduction in the volume of air inside the large mold that would need to be removed using traditional vacuum bagging techniques. In known vacuum bagging operations for large molds, the volume of air to be vacuumed is roughly equal to the volume of the mold itself, thus resulting in long vacuum cycle times. In contrast, the techniques described herein can allow for a substantial reduction in the volume of air to be vacuumed from the mold, improving vacuum cycle times.

While certain optional embodiments of the present invention have been described and illustrated, it is apparent that numerous modifications and variations to those described herein are within the scope of the present invention as defined by the appended claims.

The invention claimed is:

1. A method for preparing a composite structure, the method comprising:
   disposing a laminate on an inner surface of a mold;
   preparing consumable materials and an inflatable tool outside of the mold, wherein preparing the consumable materials comprises
      assembling a plurality of breather sections, each breather section overlapping at least a part of another breather section,
      covering at least a portion of the assembled breather sections with a vacuum bag, and
      forming a tubular assembly comprising at least one of the assembled breather sections and the vacuum bag being folded over the inflatable tool;
   inserting the prepared consumable materials and the inflatable tool into the mold;
   positioning the inflatable tool inside the consumable materials; and
   inflating the inflatable tool, thereby deploying the consumable materials against the laminate on the inner surface of the mold.

2. The method of claim 1, further comprising:
   generating a vacuum to maintain the deployed consumable materials against the laminate.

3. The method of claim 1, further comprising:
   positioning the inflatable tool on the vacuum bag prior to the at least one of the assembled breather sections and the vacuum bag being folded over the inflatable tool.

4. The method of claim 1, wherein forming the tubular assembly further comprises folding the at least one of a breather section and the vacuum bag over the inflatable tool.

5. The method of claim 1, wherein assembling the plurality of breather sections further comprises marking a center line on a forward end and on an aft end of the assembled breather sections.

6. The method of claim 5, wherein folding the vacuum bag comprises marking a top center line and a bottom center line on a forward end and an aft end of the vacuum bag.

7. The method of claim 6, wherein, upon marking the top center line and the bottom center line on the forward end and on the aft end of the vacuum bag, the vacuum bag is folded to have the top center line and the bottom center line aligned with the center lines of the breather sections, thereby forming the tubular assembly.

8. The method of claim 1, wherein the tubular assembly is compacted to facilitate transportation of the tubular assembly to the mold and to facilitate insertion of the tubular assembly into the mold.

9. The method of claim 1, wherein forming the tubular assembly comprises inserting the inflatable tool into the already folded vacuum bag.

10. The method of claim 1, wherein forming the tubular assembly comprises folding the vacuum bag and at least one breather section in a longitudinal direction.

11. The method of claim 1, further comprising:
folding the tubular assembly lengthwise on itself to form a folded tubular assembly to be positioned within the mold.

12. The method of claim 11, further comprising:
rolling the folded tubular lengthwise on itself.

13. A consumable assembly for being deployed against a composite laminate positioned within a mold, the consumable assembly comprising:
an inflatable tool;
a vacuum bag; and
a plurality of breather sections, each breather section overlapping at least a part of another breather section,
wherein the vacuum bag and the plurality of breather sections are folded around the inflatable tool along a longitudinal direction prior to being inserted within the mold.

14. The consumable assembly of claim 13, wherein the longitudinal direction is among a longitudinal centerline.

15. The consumable assembly of claim 13, wherein the consumable assembly is subsequently folded lengthwise on itself such that the consumable assembly is configured for positioning within the mold.

16. The method of claim 9, wherein forming the tubular assembly comprises:
upon inserting the inflatable tool into the folded vacuum bag, folding the plurality of breather sections about the folded vacuum bag.

17. The consumable assembly of claim 13, wherein the inflatable tool comprises an inflatable membrane and an air pump.

* * * * *